Dec. 12, 1933.　　　W. W. CLOUSER　　　1,939,106

BEAMLESS BRAKE MECHANISM FOR RAILWAY CARS

Filed July 31, 1931　　　3 Sheets-Sheet 1

INVENTOR
WILLIAM W. CLOUSER
BY Geo. S. Wheelock
ATTORNEY

Dec. 12, 1933. W. W. CLOUSER 1,939,106
BEAMLESS BRAKE MECHANISM FOR RAILWAY CARS
Filed July 31, 1931 3 Sheets-Sheet 2
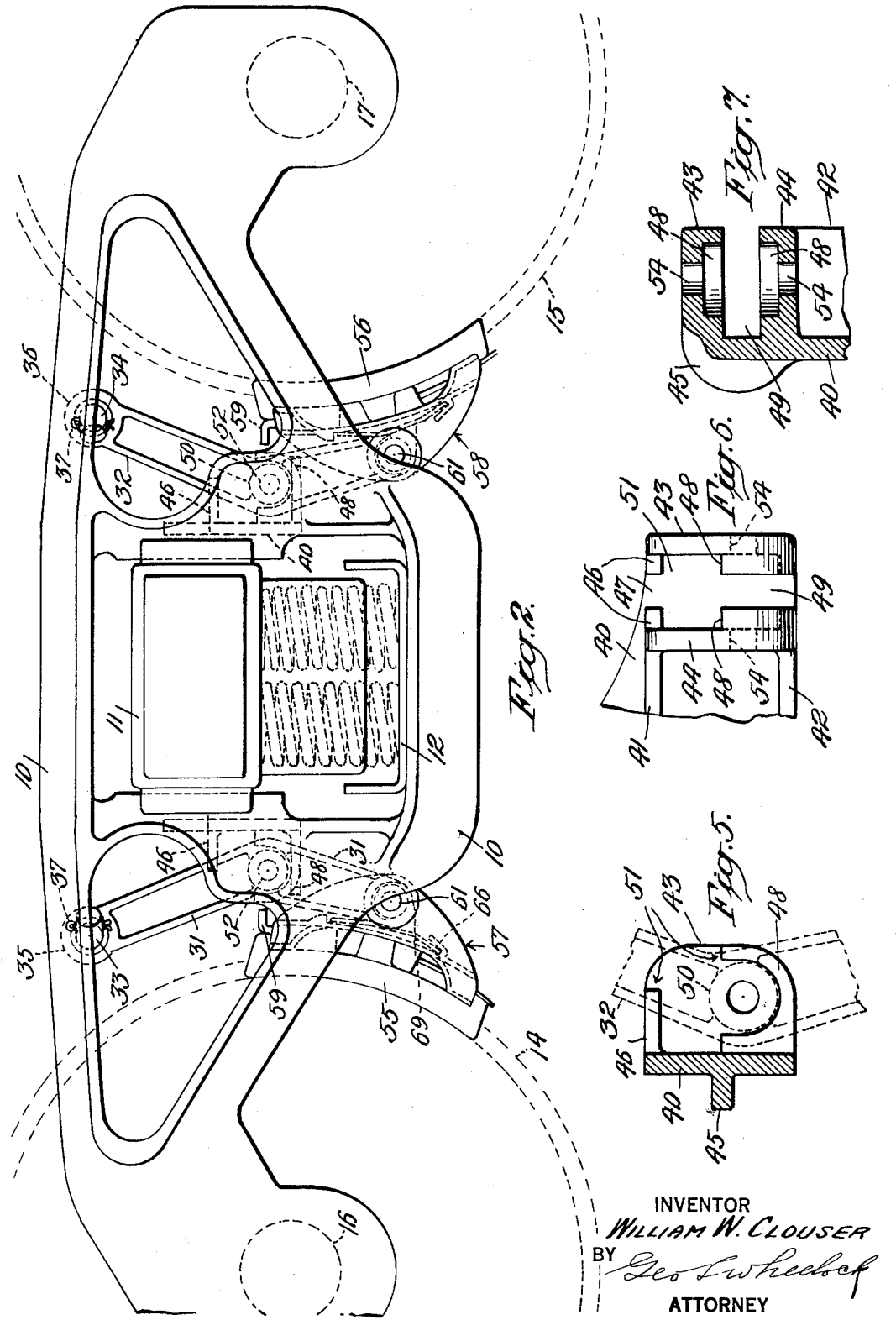
INVENTOR
WILLIAM W. CLOUSER
BY
ATTORNEY Dec. 12, 1933.       W. W. CLOUSER       1,939,106
BEAMLESS BRAKE MECHANISM FOR RAILWAY CARS
Filed July 31, 1931    3 Sheets-Sheet 3
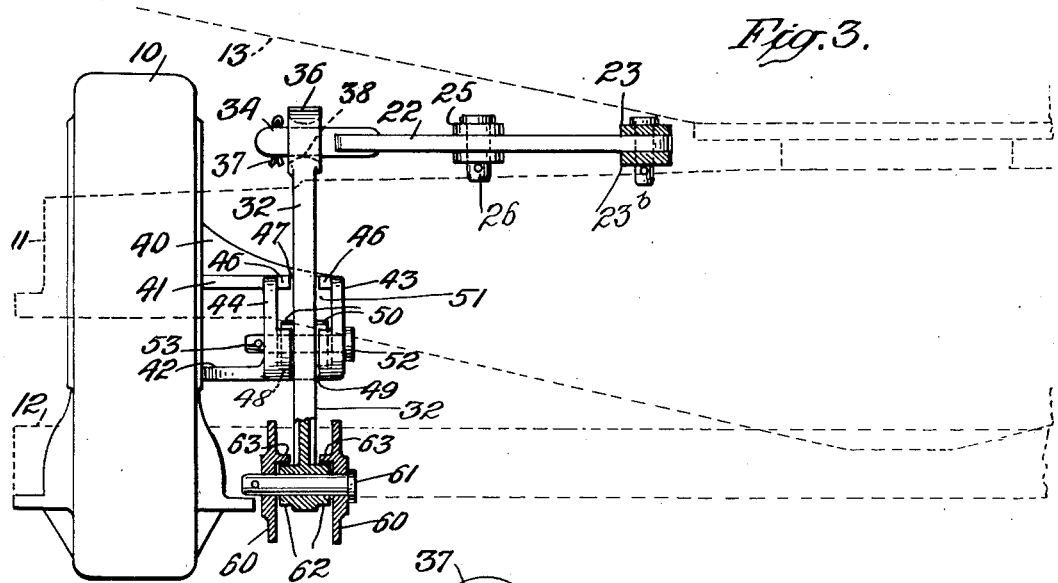
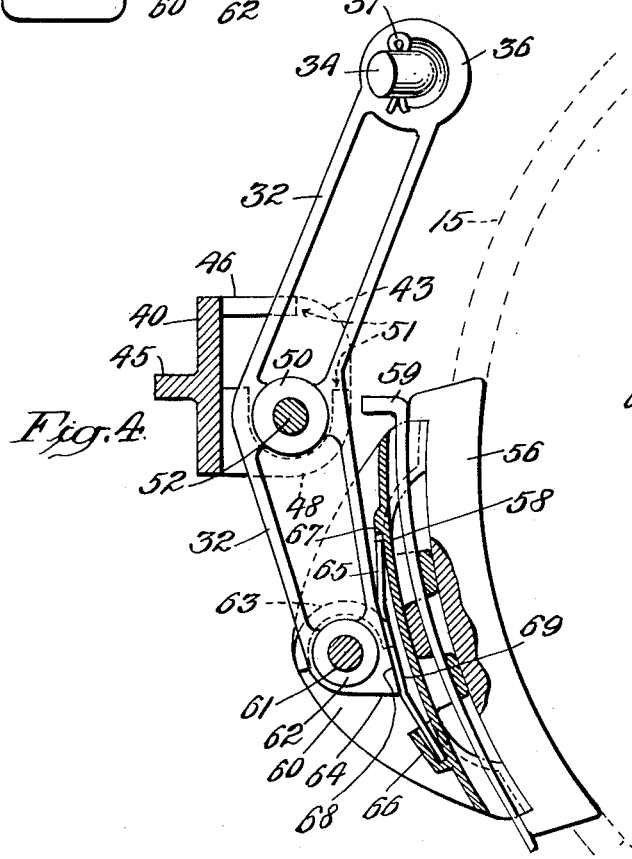
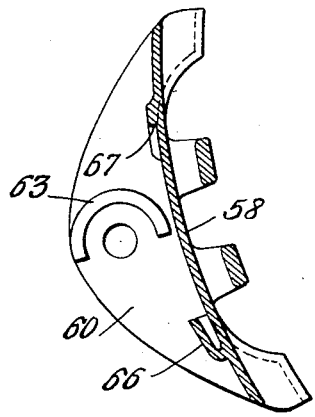
INVENTOR
WILLIAM W. CLOUSER
BY
ATTORNEY Patented Dec. 12, 1933

1,939,106

UNITED STATES PATENT OFFICE 1,939,106

BEAMLESS BRAKE MECHANISM FOR RAILWAY CARS

William W. Clouser, Hackensack, N. J., assignor to Buffalo Brake Beam Company, New York, N. Y., a corporation of New York Application July 31, 1931. Serial No. 554,177

29 Claims. (Cl. 188—53)

The present invention relates to braking mechanism of the inside hung type and which dispenses with brake beams and the need of brake beam hangers. More particularly the invention relates to braking mechanism for the four wheel trucks of freight cars. In freight cars, the said parts are arranged so close to the wheels that the spaces between the bolster and the spring plank on one side and the car wheels on the other side are exceedingly restricted.

Heretofore attempts have been made to accommodate proper braking mechanism in such restricted spaces, and while some of the attempts have been more or less successful, none of them disclose the objects and advantages of the present invention. One of the objects of the present invention is to very much simplify the construction of those parts of the braking mechanism which are beyond the opposite ends of the equalizer bar, and to reduce the weight of such parts to a minimum, while at the same time obtaining a reliable, efficient and strong construction.

Other objects of the invention are to generally improve the construction, arrangement and operation of braking mechanism.

These being among the objects of the present invention, the same consists of certain features of construction and combinations of parts to be hereinafter described and then claimed, with reference to the accompanying drawings illustrating a preferred embodiment of the invention and wherein Figure 1 is a plan, broken away at the ends, of one-half of a four wheel truck, disclosing the improved braking mechanism;

Fig. 2 is a side elevation of the same parts, the car wheels and parts of the braking mechanism being in broken lines;

Fig. 3 is a sectional elevation of parts, such as a dead truck lever, shown in Figs. 1 and 2 as viewed in the direction of the bolster and spring plank;

Fig. 4 is an enlarged sectional elevation disclosing one of the dead truck levers and its support and also its brake head and shoe;

Fig. 5 is a sectional elevation of the support for a dead truck lever, the latter being partly indicated in broken lines;

Fig. 6 is an elevation showing, partly broken away, a supporting bracket for a dead truck lever as viewed from the right of Fig. 5;

Fig. 7 is a horizontal section of the supporting bracket, partly broken away; and Fig. 8 is a sectional elevation of a brake shoe head shown in Fig. 4.

Figure 1:
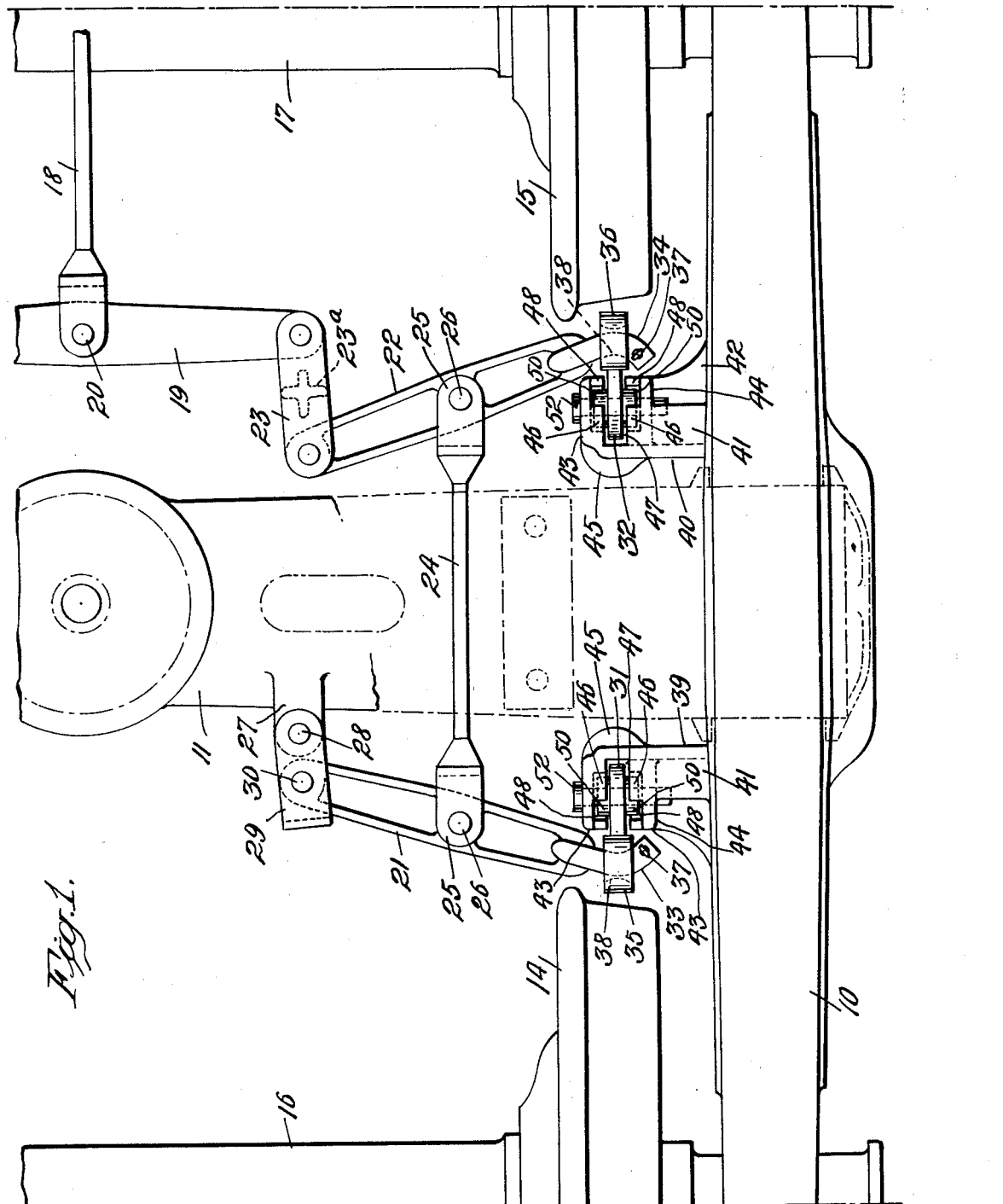

Referring to Figs. 1, 2 and 3 the side frame 10 or side casting of a truck and a truck bolster 11 and a spring plank 12 are partly shown. It is to be understood that the parts herein shown and described at one side of the car truck are the same as those at the other side which are not shown, and the explanation herein will apply to the braking mechanism at each side of the truck. The car or body bolster 13 is partly indicated in broken lines in Fig. 3 and car wheels 14, 15 and their axles 16, 17 are also indicated, sometimes in full and sometimes in broken lines.

The brake rod 18 extends longitudinally of the car truck to the end of the car for the purpose of moving it longitudinally, and, to the brake rod, the equalizer bar 19 is connected by a pivot pin 20. Extending outwardly of the center line of the car truck there are a pair of levers 21, 22, which extend horizontally in substantially the plane of the equalizer bar 19. These horizontal levers 21, 22 constitute a pair of actuators, the actuator or live lever 22 being pivotally connected at its inner end with one end of a link 23 which is pivotally connected at its other end with the corresponding end of equalizer bar 19. As shown in Fig. 3 the link 23 is in the form of a double yoke, the yokes being connected by an integral central portion 23a. These yokes respectively receive the ends of the actuator 22 and the equalizer.

A fulcrum rod 24 is located between the actuators or levers 21, 22 and the same passes transversely over the truck bolster 11. The ends of rod 24 are formed by means of yokes 25, 25 which receive intermediate portions of the lengths of the actuators 21, 22. Pivot pins 26 pass through the ends of the yokes and through the actuators 21, 22 so as to provide fulcrums therefor. The described parts are therefore located so as to extend in a horizontal plane between the upper portions of the car wheels 14, 15.

A fixed bracket 27 extends from the bolster 11 and a pivot pin 28 pivotally connects a short link 29 with the said bracket. This short link 29 is preferably of U-form as partially indicated in Fig. 1 and within it there is connected by a pivot pin 30 the adjacent inner end of the actuator 21.

Referring to Figs. 1 to 4 inclusive, the dead truck lever 31 and the dead truck lever 32 are of elbow shape with the elbows directed each toward the other. The outer ends of the horizontal levers or actuators 21, 22 are provided with outward extensions or arms 33, 34 preferably of round contour and curved towards the said brake levers 31, 32, that is outwardly away from each other. The upper end of the dead lever 31 is provided with an eye 35 formed integrally with it and the dead lever 32 with a corresponding eye 36. Through the eye 35 the arm or extension 33 passes and through the eye 36 the arm or extension 34 passes, so as to form an operative assembly of the actuators with the dead levers 31, 32, respectively. Cotter pins 37 pass through the extremities of the arms or extensions 33, 34 so as to unite the parts against separation.

It is clearly shown in Fig. 1 that the openings of the eyes 35, 36 are somewhat larger than the cross-sections of the extension arms 33, 34 and that the openings are transversely rounded at 38. As the dead levers 31, 32 extend downwardly below the outer ends of the actuators 21, 22, the construction just described provides slip-joint connections between the actuators and the dead levers, which act in the nature of universal joints, inasmuch as the arms 33, 34 are curved, one towards the other. These universal joints enable the connected parts to take various positions due to the movement of the truck bolster 11, the movement of the connected parts and vibrations or shocks, without effecting the operability of the assembly. The described connection between the dead levers and the actuators 21, 22 also serves to partially support the said levers.

The drawings and description will now apply to one of the dead levers and concomitant parts, but it is to be understood that each of the dead levers and their concomitant parts are similarly constructed and operated.

Referring to Figs. 4 to 7 inclusive the dead lever 32 is supported from its elbow, so as to fulcrum. The supports for both the dead levers are provided by inward brackets or castings 39, 40 preferably formed integrally with the truck side-frame 10. Bracket 40 will now be described, the bracket 39 being the same as before stated. This bracket 40 is provided with horizontal reinforcing flanges 41, 42 and at its inner end with a pair of spaced cheeks or side walls 43, 44 which extend outwardly towards the adjacent car wheel 15. The back of bracket 40 is provided with a reinforcing rib 45 so as to reinforce and strengthen the cheeks or side walls 43, 44.

At the upper ends of the spaced cheeks 43, 44 inward shoulders 46 are provided and between them there is an upper slot 47. At the lower ends of the spaced cheeks 43, 44 there are inward shoulders 48 separated by a slot 49 located in line with and below the slot 47. These lower shoulders 48 are curved semi-circularly and constitute stirrups or seats, the seats facing upwardly. Cylindrical bosses or trunnions 50 are formed integrally with opposite sides of the deal lever 32, being located at the elbow of this lever. Above the lower shoulders 48 there is provided an enlarged throat 51 which faces towards the car wheel 15, and this throat is of such size as to enable the bosses 50 with the elbow of the dead lever 32 to be passed through it, so that the said bosses may be seated and bear in the upward seats of the lower shoulders or saddles 48, so as to furnish a fulcrum for the said lever. The upper end of the dead lever 32 passes through the slot 47 and may move therein and the lower end of the said lever passes through the lower slot 49 and may move therein. A securing pin 52 in the form of a pivot pin is passed through openings 54 in the cheeks 43, 44 and through the bosses 50 and is retained by means of a pin or keeper 53.

It will be understood that the dead lever 32 may be oscillated in one or the other direction, because it can move in the guide slots 47, 49 between the upper and lower shoulders of the cheeks, between which the lever is fulcrumed by means of the bosses 50. The through pin 52 holds the dead lever 32 to its seat. If the pin 52 should accidentally be lost, the dead lever 32 is not apt to drop because it would still be supported by the bosses 50. If the dead lever 32 should be dislodged from its seat, it will still be supported by the horizontal arm 34 of the live lever or actuator 22, so that the said lever will not drop to the track. It will be noticed that the fulcruming point of the dead lever 32 is placed substantially in the horizontal plane of the wheel axle 17, which is the most advantageous point for obtaining the desired results. Furthermore, by making the dead lever 32 of elbow shape and fulcruming the same at the elbow with the elbow directed away from the car wheel 15, the said lever extends along a line more or less approximating the curve of the car wheel, which is also advantageous in arranging the parts in the restricted space between the car wheel and the bolster 11.

The brake-shoes 55, 56 of the dead truck levers 31, 32 are mounted upon brake-shoe heads 57, 58 to which they are secured by a retaining key 59. Referring more particularly to Figs. 3, 4 and 8, each brake shoe head is provided with spaced flanges or cheeks 60 cast integrally therewith and through them passes a pivot pin 61 which also passes through cylindrical bosses 62 integrally formed at opposite sides of the lower end of dead lever 32. At the inner sides of the spaced cheeks 60 of the brake shoe head 58 there are provided shoulders 63 which are curved semi-circularly, but in an upward direction, the recesses or seats of said shoulders being presented downwardly. When the brake shoe head is properly assembled with the dead lever 32, the inward shoulders 63 rest as saddles upon the bosses 62, whereby the brake shoe head is supported and permitted to move on the fulcrum furnished by the bosses and the pivot pin 61. The pivot pin 61 therefore constitutes the real support for the brake-shoe head 58, but if pivot pin 61 should be accidentally lost, the brake-shoe head would still be supported from the dead lever 32 by means of the saddles 63 resting upon the bosses 62. It will thus be seen that each of the dead truck levers is provided with one pair of bosses at their elbows and with another pair of bosses at their lower ends, and that the seats furnished by the stirrups 48 and by the saddles 63 will provide fulcruming points for the parts, should the pivot pins connecting them become loose or accidentally lost.

Referring to Fig. 4, the lower extremity of the dead lever 32 is extended in a downward toe 64 below the bosses 62. This toe is adapted to act upon a bowed tension spring 65 of strip steel, the lower end of which is seated in a pocket portion 66 formed at the back of the brake-shoe head, while the upper end of the spring 65 is adapted to abut against a shoulder 67 also formed at the back of the brake-shoe head. In order to maintain the concentricity of the face of the brake-shoe 56, the edge 68 of the toe 64 is flattened and the flat surface bears upon the flat portion 69 of the tension spring 65. It will be seen that the tension spring 65 in connection with the flattened surface 68 of the toe will allow a resilient action between the brake-shoe head and the dead lever 32, so that the wear face of the brake-shoe may accommodate itself at all times to the curvature of the tread of the car wheel, so that this construction maintains the concentricity of the parts whether new or worn.

Briefly summing up the advantageous features of the present invention they are as follows:

Each truck side frame preferably supports corresponding dead truck levers so that two separate units are provided, although the invention does not necessarily include such an arrangement. Each dead truck lever is at the same time its own hanger, so that separate hangers are not necessary, although they might be employed, if desired. Each dead lever is fulcrumed at about the mid-length thereof upon the side frame, enabling each such lever when of elbow shape to be arranged substantially concentric with the curvature of the adjacent car wheel. The fulcruming of each dead lever is assured by reason of the two-fold precaution against dislocation of the same from its fulcruming point. If perchance the pivot pin between a dead lever and its support should become dislodged, the dead lever is not liable to become unseated by jumping out of its bearings, because the shoulders 46 of the support act as stops or abutments for the bosses 50. To remove either dead lever it is necessary to lift the same from its seat and then move it outwardly in the direction of the throat 51 so that the bosses 50 can be moved through the throat, and such action is not apt to take place when the lever is in place even though the pin at the fulcrum should be dislodged. However, should a dead lever be entirely dislodged from its fulcruming position, it will be supported by means of the prolongation or extension from the horizontal actuating lever and will not drop to the track. The universal joint connections between the extension arms of the horizontal actuators and the dead levers will allow the parts to take different positions with respect to each other due to the movement of the truck bolster and the like. It will also be seen that the means whereby each brake-shoe head is hung on the brake lever therefor constitutes a double assurance against falling of the brake-shoe head away from the lever.

It will be seen by those skilled in this art that the construction, arrangement and operation of the assembled parts of the improved brake mechanism, and the simplicity thereof, are such that the entire mechanism may be arranged partly in a horizontal plane between the tops of the side frames of a truck at a maximum elevation above the track, and partially at either side of the truck just within the vertical planes of the side frames, and that in consequence thereof a maximum amount of space is provided which is free from brake operating parts and which overcomes the possibility of obstructions between the rails interfering with the mechanism. This free and large interior space within the truck amply enables that freedom of movement which is desirable when inspection and maintenance are necessary. Furthermore, all of these considerations tend to easier inspection and maintenance from the outside of the truck.

It is obvious to those skilled in the art that the invention as shown and described is susceptible to more or less modification without departing from the spirit of the invention as defined in the appended claims.

What I claim as new is,—

1. In a braking mechanism for railway cars, in combination, supporting means, brake-shoe heads, and dead truck levers fulcrumed upon the supporting means and carrying the heads, a pair of connected levers acting as actuators for the dead levers, and having slip joint connections with the dead levers respectively, a fixed support whereon the actuator of one of the dead levers is pivotally mounted, and a brake rod connected with the other actuator to apply the brake shoes.

2. In a braking mechanism for railway cars, in combination, supporting means, brake-shoe heads, and dead truck levers fulcrumed upon the supporting means and carrying the heads, eyes on the levers, a pair of connected levers acting as actuators for the dead levers, and having extensions loosely entering the eyes of the dead levers respectively, a fixed support whereon the actuator of one of the dead levers is pivotally mounted, and a brake rod connected with the other actuator to apply the brake shoes.

3. In a braking mechanism for railway cars, in combination, supporting means, brake-shoe heads, and dead truck levers fulcrumed upon the supporting means and carrying the heads, eyes on the levers having transversely rounded openings, a pair of connected levers acting as actuators for the dead levers, and having extensions loosely guided in the eyes of the dead levers respectively, a fixed support whereon the actuator of one of the dead levers is pivotally mounted, and a brake rod connected with the other actuator to apply the brake shoes.

4. In a braking mechanism for railway cars, in combination, supporting means, brake-shoe heads, and dead truck levers fulcrumed upon the supporting means and carrying the heads, eyes on the levers, a pair of connected levers acting as actuators for the dead levers, and having curved extensions loosely guided in the eyes of the dead levers respectively, a fixed support whereon the actuator of one of the dead levers is pivotally mounted, and a brake rod connected with the other actuator to apply the brake shoes.

5. In a braking mechanism for railway cars, in combination, a car-truck side frame having inward brackets, brake-shoe heads, dead truck levers fulcrumed to and extending above and below the brackets, and carrying the heads at their lower ends, a pair of connected horizontal levers acting as actuators for the dead levers respectively, the horizontal levers having universal joint connection with the upper ends of the dead levers and extending inwardly thereof, a car-truck bolster on which the actuator of one of the dead levers is pivotally mounted, and a brake rod connected with the other actuator to apply the brake shoes.

6. In a braking mechanism for railway cars, in combination, a car-truck side frame having inward brackets, brake-shoe heads, dead truck levers fulcrumed to and extending above and below the brackets, and carrying the heads at their lower ends, a pair of horizontal levers acting as actuators for the dead levers respectively, a rod connecting the horizontal levers and on which they are fulcrumed, the horizontal levers having a slip joint connection with the upper ends of the dead levers and extending inwardly thereof, a car-truck bolster on which the actuator of one of the dead levers is pivotally mounted, and a brake rod connected with the other actuator to apply the brake shoes, the connecting rod of the levers extending transversely over the bolster.

7. In a braking mechanism for railway cars, in combination, a car-truck side frame having inward brackets, brake-shoe heads, dead elbow truck levers fulcrumed at their elbows to and extending above and below the brackets, and carrying the heads at their lower ends, the elbows being mutually presented together, a pair of connected horizontal levers acting as actuators for the dead levers respectively, the horizontal levers having a slip joint connection with the upper ends of the dead levers and extending inwardly thereof, a car-truck bolster on which the actuator of one of the dead levers is pivotally mounted, and a brake rod connected with the other actuator to apply the brake shoes.

8. In a braking mechanism for railway cars, in combination, a car-truck side frame having inward brackets, brake-shoe heads, dead truck levers fulcrumed to and extending above and below the brackets, and carrying the heads at their lower ends, eyes at the upper ends of the levers, a pair of connected horizontal levers acting as actuators for the dead levers respectively, and extending inwardly thereof, and having outward extensions curved in opposite directions and loosely guided in the eyes of the upper ends of the dead levers, a car-truck bolster on which the actuator of one of the dead levers is pivotally mounted, and a brake rod connected with the other actuator to apply the brake shoes.

9. In a braking mechanism for railway cars, in combination, a car-truck side frame having inward brackets formed with seating or bearing recesses, brake-shoe heads, dead truck levers, each having, intermediately thereof, side bosses journaled in the recesses, and each lever extending above and below the brackets, and carrying the heads at their lower ends, actuators acting on the upper ends of such levers, and means for operating the actuators to apply the brake shoes.

10. In a braking mechanism for railway cars, in combination, a car-truck side frame having inward brackets formed with seating or bearing recesses, the recesses having lateral throats, brake-shoe heads, dead truck levers, each having, intermediately thereof, side bosses adapted to be admitted through the throats, to be journaled in the recesses, and each lever extending above and below the brackets, and carrying the heads at their lower ends, actuators acting on the upper ends of such levers, and means for operating the actuators to apply the brake shoes.

11. In a braking mechanism for railway cars, in combination, a car-truck side frame having inward brackets formed with seating or bearing recesses, brake-shoe heads, dead truck levers, each having, intermediately thereof, side bosses journaled in the recesses, the brackets having inward shoulders above the bosses, and each lever extending above and below the brackets, and carrying the heads at their lower ends, actuators acting on the upper ends of such levers, and means for operating the actuators to apply the brake shoes.

12. In a braking mechanism for railway cars, in combination, a car-truck side frame having inward brackets formed with seating or bearing recesses, brake-shoe heads, dead truck levers, each having, intermediately thereof, side bosses journaled in the recesses, and each lever extending above and below the brackets, and carrying the heads at their lower ends, pivot pins passing through the bosses and the side walls of the recesses, actuators acting on the upper ends of such levers, and means for operating the actuators to apply the brake shoes.

13. In a braking mechanism for railway cars, in combination, supporting means, brake-shoe heads, dead truck levers fulcrumed upon the supporting means and extending upwardly, and carrying the brake-shoe heads, side bosses on the levers, bearing portions on the heads hung on the bosses, actuators acting on such levers, and means for operating the actuators to apply the brake shoes.

14. In a braking mechanism for railway cars, in combination, supporting means, brake-shoe heads having spaced cheeks, dead truck levers fulcrumed upon the supporting means and extending upwardly, and carrying the brake-shoe heads, side bosses on the levers, bearing portions between the cheeks, whereby the heads are hung on the bosses, actuators acting on such levers, and means for operating the actuators to apply the brake shoes.

15. In a braking mechanism for railway cars, in combination, supporting means, brake-shoe heads, dead truck levers fulcrumed upon the supporting means and extending upwardly, and carrying the brake-shoe heads, side bosses on the levers, bearing portions on the heads hung on the bosses, a toe on each lever, a spring at the back of each head and on which bears the corresponding toe, actuators acting on such levers, and means for operating the actuators to apply the brake shoes.

16. In a braking mechanism for railway cars, in combination, supporting means, brake-shoe heads, dead truck levers fulcrumed upon the supporting means and extending upwardly, and carrying the brake-shoe heads, side bosses on the levers, bearing portions on the heads hung on the bosses, a pivot pin passing through the bosses and the corresponding head, actuators acting on such levers, and means for operating the actuators to apply the brake shoes.

17. In a braking mechanism for railway cars, in combination, a car-truck side frame having inward brackets formed with upward recesses serving as stirrups, brake-shoe heads, dead truck levers, each having side bosses intermediately thereof journaled in the stirrups, and the levers extending above and below the brackets and carrying the heads at their lower ends, side bosses on the lower ends of the levers, bearing portions serving as saddles on the heads and resting on the lower bosses, actuators acting on the upper ends of such levers, and means for operating the actuators to apply the brake shoes.

18. In a braking mechanism for railway cars, in combination, a car-truck side frame having inward brackets formed with upward recesses serving as stirrups, brake-shoe heads, dead truck levers, each having side bosses intermediately thereof journaled in the stirrups, and the levers extending above and below the brackets and carrying the heads at their lower ends, stop shoulders on the brackets and above the said bosses, side bosses on the lower ends of the levers, bearing portions serving as saddles on the heads and resting on the lower bosses, actuators acting on the upper ends of such levers, and means for operating the actuators to apply the brake shoes.

19. In a braking mechanism for railway cars, in combination, a car-truck side frame having inward brackets formed with upward recesses serving as stirrups, brake-shoe heads, dead truck levers, each having side bosses intermittently thereof journaled in the stirrups, and the levers extending above and below the brackets and carrying the heads at their lower ends, side bosses on the lower ends of the levers, spaced cheeks on the heads, bearing portions between the cheeks serving as saddles resting on the lower bosses, actuators acting on the upper ends of such levers, and means for operating the actuators to apply the brake shoes.

20. In a braking mechanism for railway cars, in combination, a car-truck side frame having inward brackets formed with upward recesses serving as stirrups, brake-shoe heads, dead truck levers, each having side bosses intermediately thereof journaled in the stirrups, and the levers extending above and below the brackets and carrying the heads at the lower ends, side bosses on the lower ends of the levers, bearing portions serving as saddles on the heads and resting on the lower bosses, pivot pins passing through the bosses at the stirrups and through the brackets, pivot pins passing through the bosses and the saddles and through the heads, actuators acting on the upper ends of such levers, and means for operating the actuators to apply the brake shoes.

21. In a braking mechanism for railway cars, in combination, a car-truck side frame, dead truck levers, each separately supported and fulcrumed at intermediate portions upon the side frame, the levers extending both upwardly and downwardly from their fulcrums, brake-shoe heads carried by the lower ends of the levers, means acting on the upper ends of the levers to operate them for applying or releasing the brake-shoes, and universal joints connecting such means with the levers.

22. In a braking mechanism for railway cars, in combination, supporting means formed with seating or bearing recesses, each recess having an outward lateral throat, brake-shoe heads, dead truck levers, each having side bosses adapted to be admitted through the throats to be journaled in the recesses, and each lever carrying a head, actuators acting on such levers, and means for operating the actuators to apply the brake shoes.

23. In a braking mechanism for railway cars, in combination, supporting means formed with seating or bearing recesses, each recess having an outward lateral throat, brake-shoe heads, dead truck levers, each having side bosses adapted to be admitted through the throats to be journaled in the recesses, the supporting means having shoulders slightly above the bosses, and each lever carrying a head, actuators acting on such levers, and means for operating the actuators to apply the brake shoes.

24. In a braking mechanism for railway cars, in combination, supporting means formed with seating or bearing recesses, each recess having an outward lateral throat, brake-shoe heads, dead truck levers, each having side bosses adapted to be admitted through the throats to be journaled in the recesses, the supporting means having shoulders slightly above the bosses, and each lever carrying a head, pivot pins passing through the side walls of the recesses at points below the shoulders, and through the bosses, actuators acting on such levers, and means for operating the actuators to apply the brake shoes.

25. In a braking mechanism for railway cars, in combination, supporting means, brake-shoe heads, dead truck levers fulcrumed upon the supporting means and carrying the brake-shoe heads, side bosses on the levers, bearing portions on the heads hung on the bosses, actuators acting on such levers, and means for operating the actuators to apply the brake shoes.

26. In a braking mechanism for railway cars, in combination, supporting means, brake-shoe heads, dead truck levers fulcrumed upon the supporting means, and carrying the brake-shoe heads, side bosses on the levers, bearing portions on the heads journaled on the bosses, a pivot pin passing through the bosses and the corresponding head, actuators acting on such levers, and means for operating the actuators to apply the brake shoes.

27. In a braking mechanism for railway cars, in combination, supporting means having brackets formed with upward recesses serving as stirrups, brake-shoe heads, dead truck levers, each having a pair of side bosses journaled in the stirrups, and the levers carrying the heads, an additional pair of side bosses on the levers, bearing portions on the heads journaled on the additional pair of bosses, actuators acting on such levers, and means for operating the actuators to apply the brake shoes.

28. In a braking mechanism for railway cars, in combination, supporting means having brackets formed with upward recesses serving as stirrups, brake-shoe heads, dead truck levers, each having a pair of side bosses journaled in the stirrups, and the levers carrying the heads, an additional pair of side bosses on the levers, bearing portions on the heads journaled on the additional pair of bosses, pivot pins passing through the pair of bosses at the stirrups and through the brackets, pivot pins passing through the additional pair of bosses and through the heads, actuators acting on such levers, and means for operating the actuators to apply the brake shoes.

29. A brake lever provided with two separated pair of bosses, one pair for suspending it and the other pair for supporting a brake-shoe head.

WILLIAM W. CLOUSER.